United States Patent
Jackson et al.

(10) Patent No.: US 10,889,251 B2
(45) Date of Patent: Jan. 12, 2021

(54) BRACKET ASSEMBLIES FOR DETACHABLY CONNECTING AUDIBLE VEHICLE ALERT SYSTEMS

(71) Applicant: FORD GLOBAL TECHNOLOGIES, LLC, Dearborn, MI (US)

(72) Inventors: Eric Emil Jackson, Canton, MI (US); Aaron Nunn, Carleton, MI (US); Raymond Rouse, Garden City, MI (US); Russell Knight, New Boston, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/247,617

(22) Filed: Jan. 15, 2019

(65) Prior Publication Data
US 2020/0223373 A1 Jul. 16, 2020

(51) Int. Cl.
*H04R 3/00* (2006.01)
*B60R 11/02* (2006.01)
*B60Q 5/00* (2006.01)
*B60R 11/00* (2006.01)

(52) U.S. Cl.
CPC ............ *B60R 11/0217* (2013.01); *B60Q 5/00* (2013.01); *B60R 2011/004* (2013.01); *B60R 2011/0052* (2013.01); *B60R 2011/0059* (2013.01); *B60R 2011/0066* (2013.01); *B60R 2011/0078* (2013.01); *B60R 2011/0084* (2013.01)

(58) Field of Classification Search
CPC .......... H04R 1/025; H04R 9/02; H04R 1/026; H04R 1/345; H04R 2201/029
See application file for complete search history.

(56) References Cited

U.S. PATENT DOCUMENTS

| | | | |
|---|---|---|---|
| 8,248,273 B2 | 8/2012 | Hayashi et al. | |
| 8,598,997 B2 | 12/2013 | Hayashi et al. | |
| 9,126,524 B2 | 9/2015 | Fulton et al. | |
| 9,580,010 B2 | 2/2017 | Sakakibara et al. | |
| 2003/0026445 A1* | 2/2003 | Anderson | H04R 1/026 381/386 |
| 2011/0199199 A1 | 8/2011 | Perkins | |
| 2013/0314224 A1 | 11/2013 | Nakayama et al. | |
| 2014/0015654 A1* | 1/2014 | Nakayama | B60Q 5/008 340/425.5 |
| 2018/0048957 A1 | 2/2018 | Petley et al. | |

OTHER PUBLICATIONS

Mark Kane: Guide Dogs: Bark of Approval to Jaguar I-Pace Pedestrian Safety System, Oct. 14, 2018, three pages; https://insideevs.com/guide-dogs-jaguar-i-pace-pedestrian-safety-system/.

* cited by examiner

*Primary Examiner* — Amir H Etesam
(74) *Attorney, Agent, or Firm* — David Coppiellie; Carlson, Gaskey & Olds (57) ABSTRACT

This disclosure is directed to audible vehicle alert systems that include bracket assemblies for detachably mounting components of the audible vehicle alert systems to vehicles. Exemplary audible vehicle alert systems may include a first bracket, a second bracket detachably secured to the first bracket, and a speaker unit mounted to the second bracket. The second bracket may be disconnected from the first bracket during a servicing event for servicing the speaker unit or some other component of the audible vehicle alert system.

10 Claims, 5 Drawing Sheets

BRACKET ASSEMBLIES FOR DETACHABLY CONNECTING AUDIBLE VEHICLE ALERT SYSTEMS

TECHNICAL FIELD

This disclosure relates to audible vehicle alert systems, and more particularly to bracket assemblies for removably mounting components of audible vehicle alert systems to vehicles.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

During electric-only operation, electrified vehicles often emit less running noise compared to conventional internal combustion engine powered motor vehicles.

SUMMARY

An audible vehicle alert system according to an exemplary aspect of the present disclosure includes, among other things, a first bracket, a second bracket detachably secured to the first bracket, and a speaker unit mounted to the second bracket.

In a further non-limiting embodiment of the foregoing audible vehicle alert system, the first bracket includes a mounting base and an arm that extends from the mounting base.

In a further non-limiting embodiment of either of the foregoing audible vehicle alert systems, the mounting base is mounted to a frame rail of a vehicle frame, and the arm is connected to the second bracket.

In a further non-limiting embodiment of any of the foregoing audible vehicle alert systems, one of the first bracket or the second bracket includes a track and the other of the first bracket or the second bracket includes an arm slidably received within a groove of the track.

In a further non-limiting embodiment of any of the foregoing audible vehicle alert systems, one of the first bracket or the second bracket includes a track and the other of the first bracket or the second bracket includes a retention finger removably received within a window of the track.

In a further non-limiting embodiment of any of the foregoing audible vehicle alert systems, the first bracket includes a first mounting flange that is secured to a second mounting flange of the second bracket by a bolt and a nut.

In a further non-limiting embodiment of any of the foregoing audible vehicle alert systems, a mounting platform of the first bracket includes a plurality of slotted openings that are each configured to receive a finger latch of the second bracket.

In a further non-limiting embodiment of any of the foregoing audible vehicle alert systems, the finger latches are rotatable between a first position and a second position within the plurality of slotted openings to removably secure the second bracket to the first bracket.

In a further non-limiting embodiment of any of the foregoing audible vehicle alert systems, a jumper wire includes a first wiring harness connected to a port of the speaker unit and a second wiring harness supported by a platform of the first bracket.

In a further non-limiting embodiment of any of the foregoing audible vehicle alert systems, the second bracket includes a mounting tab configured to engage a mounting extension of a mounting bracket.

In a further non-limiting embodiment of any of the foregoing audible vehicle alert systems, a push pin is received through the mounting tab and the mounting extension.

In a further non-limiting embodiment of any of the foregoing audible vehicle alert systems, the second bracket is secured to the first bracket by a fastener.

A vehicle according to another exemplary aspect of the present disclosure includes, among other things, a vehicle component, a first bracket mounted to the vehicle component, a second bracket detachably secured to the first bracket, and a speaker unit mounted to the second bracket.

In a further non-limiting embodiment of the foregoing vehicle, the second bracket is detachably secured to a mounting bracket of a bumper.

In a further non-limiting embodiment of either of the foregoing vehicles, the vehicle component is a frame rail, and the first bracket includes a mounting base mounted to the frame rail and an arm that extends from the mounting base at an inboard side of the frame rail.

In a further non-limiting embodiment of any of the foregoing vehicles, a distal end portion of the arm engages a track of the second bracket.

In a further non-limiting embodiment of any of the foregoing vehicles, the distal end portion includes a first arm received within a first groove of the track, a second arm received within a second groove of the track, and a finger latch received within a window of the track.

In a further non-limiting embodiment of any of the foregoing vehicles, the second bracket is secured to the first bracket by a fastener.

In a further non-limiting embodiment of any of the foregoing vehicles, the second bracket is rotatably secured to the first bracket.

In a further non-limiting embodiment of any of the foregoing vehicles, a jumper wire includes a first wiring harness connected to a port of the speaker unit and a second wiring harness supported by a platform of a mounting base of the first bracket.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details audible vehicle alert systems that include bracket assemblies for detachably mounting components of the audible vehicle alert systems to vehicles. Exemplary audible vehicle alert systems may include a first bracket, a second bracket detachably secured to the first bracket, and a speaker unit mounted to the second bracket. The second bracket may be detached from the first bracket during a servicing event for servicing the speaker unit or some other component of the audible vehicle alert system. These and other features of this disclosure are described in greater detail below.

Figure 1:
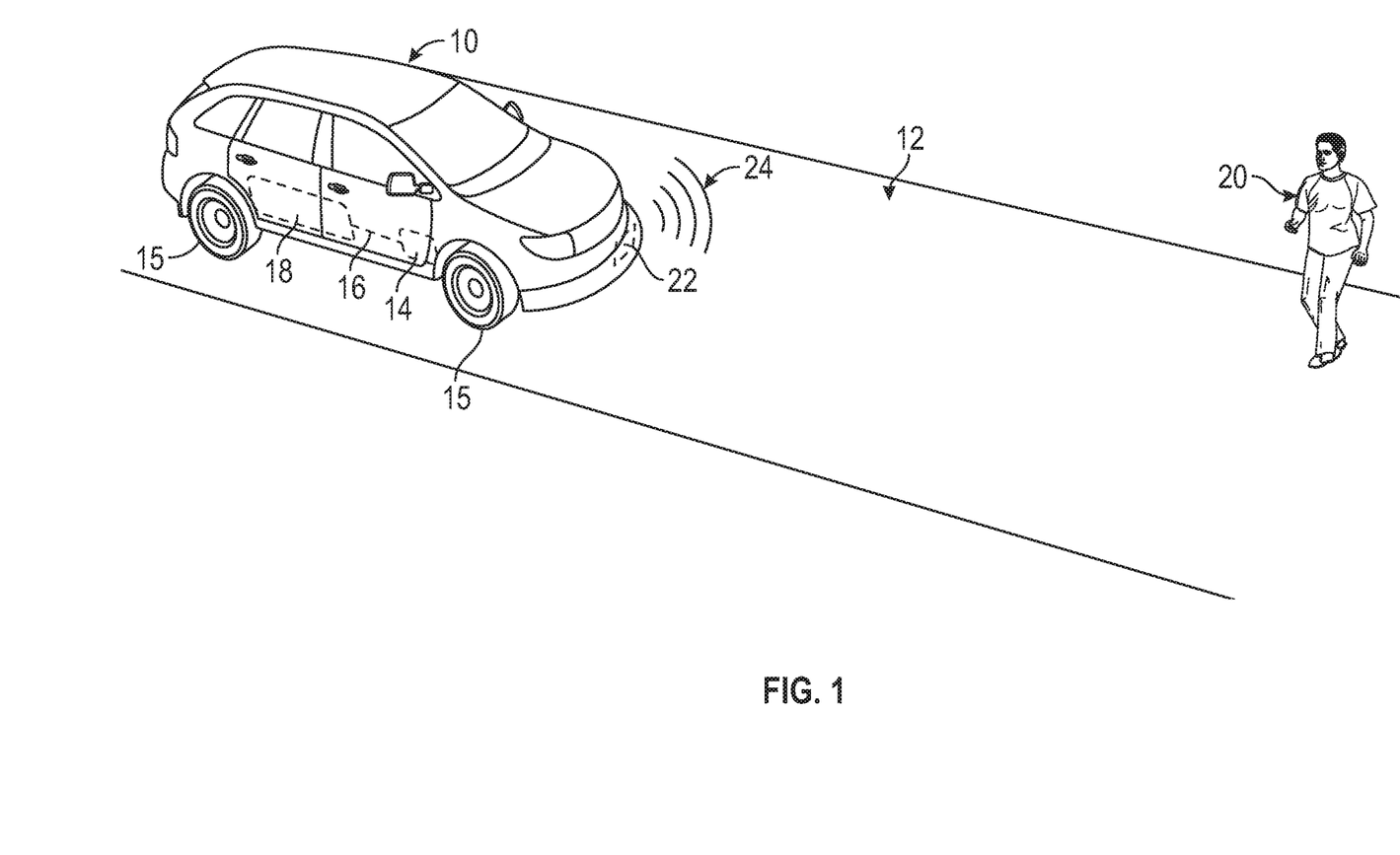
FIG. 1 schematically illustrates an electrified vehicle equipped with an audible vehicle alert system.

FIG. 1 schematically illustrates an electrified vehicle 10 traveling along a roadway 12. The electrified vehicle 10 could be a car, a truck, a van, a sport utility vehicle, or any other type of vehicle that includes an electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEVs), fuel cell vehicles, etc. Therefore, although not specifically shown in this embodiment, the electrified vehicle 10 could be equipped with an internal combustion engine that can be employed either alone or in combination with other energy sources to propel the electrified vehicle 10.

Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component.

In the illustrated embodiment, the electrified vehicle 10 is a full electric vehicle propelled solely through electric power, such as by one or more electric machines 14, without any assistance from an internal combustion engine. The electric machine 14 may operate as an electric motor, an electric generator, or both. The electric machine 14 receives electrical power and provides a rotational output torque to one or more drive wheels 15 of the electrified vehicle 10.

A voltage bus 16 electrically connects the electric machine 14 to a battery pack 18. The battery pack 18 is an exemplary electrified vehicle battery. The battery pack 18 may be a high voltage traction battery pack that includes a plurality of battery arrays (i.e., battery assemblies or groupings of rechargeable battery cells) capable of outputting electrical power to operate the electric machine 14 and/or other electrical loads of the electrified vehicle 10. Other types of energy storage devices and/or output devices can also be used to electrically power the electrified vehicle 10. The battery pack 18 may be mounted at various locations of the electrified vehicle 10.

During electric-only operation of the electrified vehicle 10 (i.e., during situations where the electric machine 14 is supplying power to the drive wheels 15 without any assistance from an internal combustion engine), a relatively minimal amount of running noise may be emitted by the electrified vehicle 10. The running noise may be so quiet that a nearby pedestrian 20, who may be attempting to cross over the roadway 12, is not alerted to the presence of the electrified vehicle 10. The electrified vehicle 10 may therefore be equipped with an audible vehicle alert system (AVAS) 22 for selectively emitting audible alerts 24, such as when the electrified vehicle 10 is operating in an electric-only mode and traveling above a predefined speed threshold. The audible alerts 24 are loud enough to alert the pedestrian 20 of the presence of the nearby electrified vehicle 10, thereby increasing pedestrian safety.

The AVAS 22, or portions therefore, may periodically need to be removed from the electrified vehicle 10 for servicing, repairing, or replacing one or more components of the AVAS 22. Detachable bracket assemblies for removably mounting portions of the AVAS 22 to the electrified vehicle 10 are therefore proposed within this disclosure.

Figure 2:
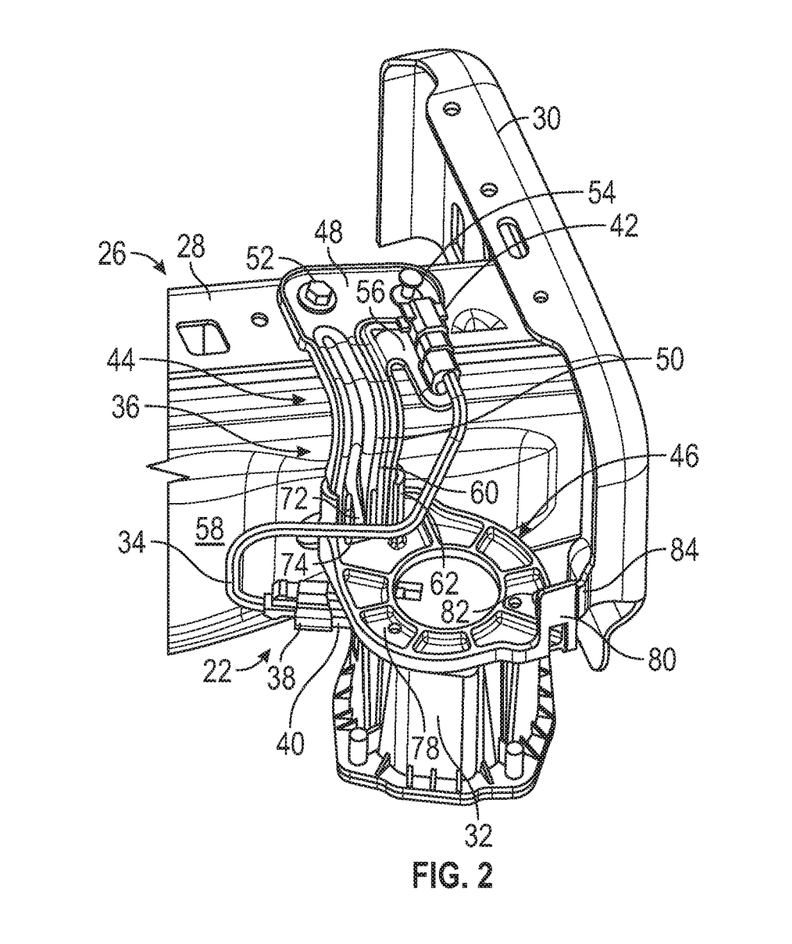
FIG. 2 illustrates an exemplary bracket assembly for mounting an audible vehicle alert system to a vehicle according to a first embodiment of this disclosure.
Figure 3:
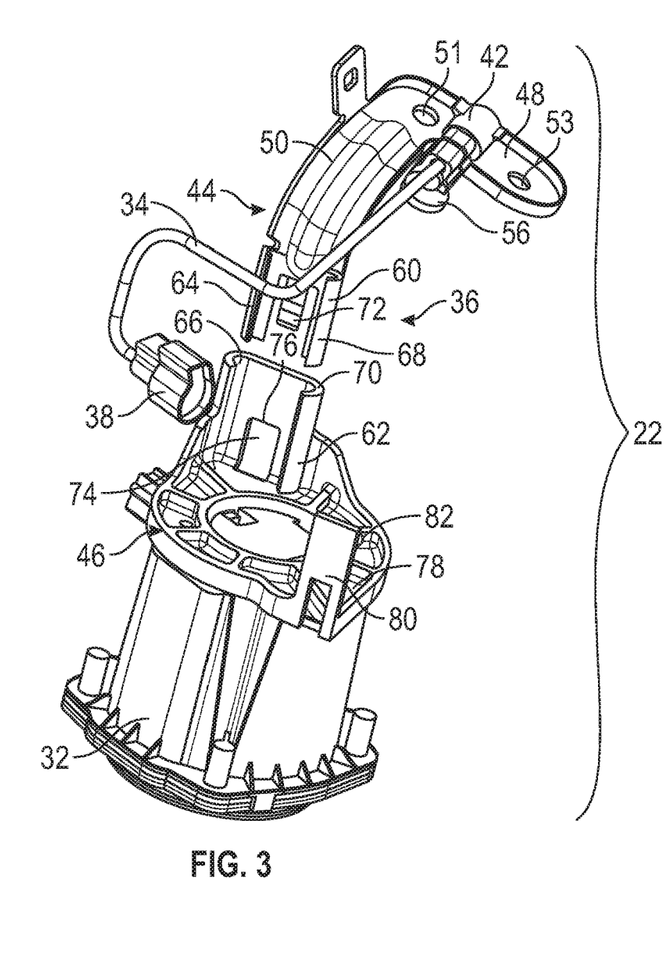
FIG. 3 is an exploded view of the bracket assembly of FIG. 2.

FIGS. 2 and 3, with continued reference to FIG. 1, illustrate a first exemplary AVAS 22. The AVAS 22 may be mounted to portions of a vehicle frame 26. The vehicle frame 26 is removed in FIG. 3 to better illustrate the various components of the AVAS 22. Although shown and described as attached to the vehicle frame 26, the AVAS 22 could be mounted to any vehicle component.

The vehicle frame 26 generally represents the main supporting structure of the electrified vehicle 10 of FIG. 1. The AVAS 22 may be mounted to a frame rail 28 of the vehicle frame 26. In an embodiment, the frame rail 28 is a longitudinally extending component that establishes a length of the vehicle frame 26. However, the AVAS 22 could alternatively or additionally be mounted a laterally extending component that establishes a width of the vehicle frame 26, or to any other component of the vehicle frame 26, or to any other vehicle component.

A mounting bracket 30 may be secured to the frame rail 28 for supporting a bumper (not shown) or other structural body component of the electrified vehicle 10. The mounting bracket 30 may support either a front bumper or a rear bumper of the electrified vehicle 10. The AVAS 22 may be configured to connect to the mounting bracket 30 in addition to the frame rail 28, as is discussed in greater detail below.

In an embodiment, the AVAS 22 includes a speaker unit 32, a jumper wire 34, and a bracket assembly 36 for securing the speaker unit 32 and the jumper wire 34 relative to the vehicle frame 26. The AVAS 22 may be delivered to the final assembly plant as an assembly component, thereby simplifying the overall vehicle assembly process.

The speaker unit 32 may be any speaker that is capable of emitting audible alerts for alerting pedestrians that the electrified vehicle 10 is operating nearby. In an embodiment, the audible alerts emitted by the speaker unit 32 mimic the sound of an idling internal combustion engine or the sound of tires rolling across pavement or gravel.

The jumper wire 34 may include a first wiring harness 38 for connecting to a port 40 of the speaker unit 32 and a second wiring harness 42 for electrically connecting the speaker unit 32 to a power source (not shown) of the electrified vehicle 10. The jumper wire 34 may include a length that is long enough to permit lowering of the speaker unit 32 during a servicing event.

The bracket assembly 36 may include a first bracket 44 and a second bracket 46 that is detachable from the first bracket 44. The first bracket 44 and the second bracket 46 may be made from dissimilar materials. In an embodiment, the first bracket 44 is a metallic bracket (e.g., steel, etc.) and the second bracket 46 is a plastic bracket (e.g., polypropylene, nylon, etc.). However, the material make-ups of the first bracket 44 and the second bracket 46 are not intended to limit this disclosure.

The first bracket 44 may include a mounting base 48 and an arm 50 that extends from the mounting base 48. The mounting base 48 may be secured directly to the frame rail 28 of the vehicle frame 26 using some combination of fasteners. In an embodiment, the mounting base 48 is secured to the frame rail 28 via a metallic threaded fastener 52 and a plastic push pin 54 (e.g., a screw/rivet or scrivet). The threaded fastener 52 may be received through a first opening 51 of the mounting base 48, and the push pin 54 may be received through a second opening 53 of the mounting base 48. The mounting base 48 may additionally include a platform 56 for receiving and supporting the second wiring harness 42 of the jumper wire 34.

The arm 50 may be a curved arm, in an embodiment. In a mounted position of the first bracket 44, the arm 50 extends along an inboard side 58 of the frame rail 28. A distal end portion 60 of the arm 50 may include features for engaging the second bracket 46 of the bracket assembly 36. In an embodiment, the distal end portion 60 of the arm 50 is detachably secured to a track 62 of the second bracket 46. The distal end portion 60 may include a first arm 64 that is slidably received within a first groove 66 of the track 62, a second arm 68 that is slidably received within a second groove 70 of the track 62, and a finger latch 72 that is releasably received within a window 74 of the track 62. The finger latch 72 may engage a wall 76 that circumscribes the window 74 for removably securing the second bracket 46 to the first bracket 44. The track 62 of the second bracket 46 may be slid off of the distal end portion 60 of the arm 50 of the first bracket 44 after the finger latch 72 is disengaged from the wall 76 of the window 74.

Of course, an opposite configuration is also contemplated in which the track 62 is part of the first bracket 44 and the arms 64, 68 and the finger latch 72 are part of the second bracket 46. This disclosure is therefore not limited to the exact configuration shown in these figures.

The second bracket 46 of the bracket assembly 36 may include a mounting platform 78 for receiving the speaker unit 32. The speaker unit 32 may be mounted to the mounting platform 78 in any known manner. In an embodiment, the mounting platform 78 is generally circular shaped but may include any shape for accommodating the speaker unit 32. The track 62 may extend from the mounting platform 78 at an opposite surface of the mounting platform 78 from that which receives the speaker unit 32.

A mounting tab 80 may additionally extend from the mounting platform 78. The mounting tab 80 may extend in the same direction as the track 62 but is located at a different location of the mounting platform 78 than the track 62. In an embodiment, the mounting tab 80 includes an extension 82 that is configured to engage a mounting extension 84 of the mounting bracket 30. In this way, the bracket assembly 36 may be supported relative to both the frame rail 28 and the mounting bracket 30 when mounted within the electrified vehicle 10.

The novel arrangement of the bracket assembly 36 described above allows for installation of the AVAS 22 from above (i.e., top-down) the electrified vehicle 10 while allowing service/repair of the AVAS 22 from below the electrified vehicle 10. Advantageously, no major components of the electrified vehicle 10 (e.g., bumper, cooling module, air dam assembly, headlamp, fender, etc.) need to be removed before detaching the second bracket 46 from the first bracket 44 for servicing, repairing, or replacing the speaker unit 32 or the jumper wire 34 of the AVAS 22.

Figure 4:
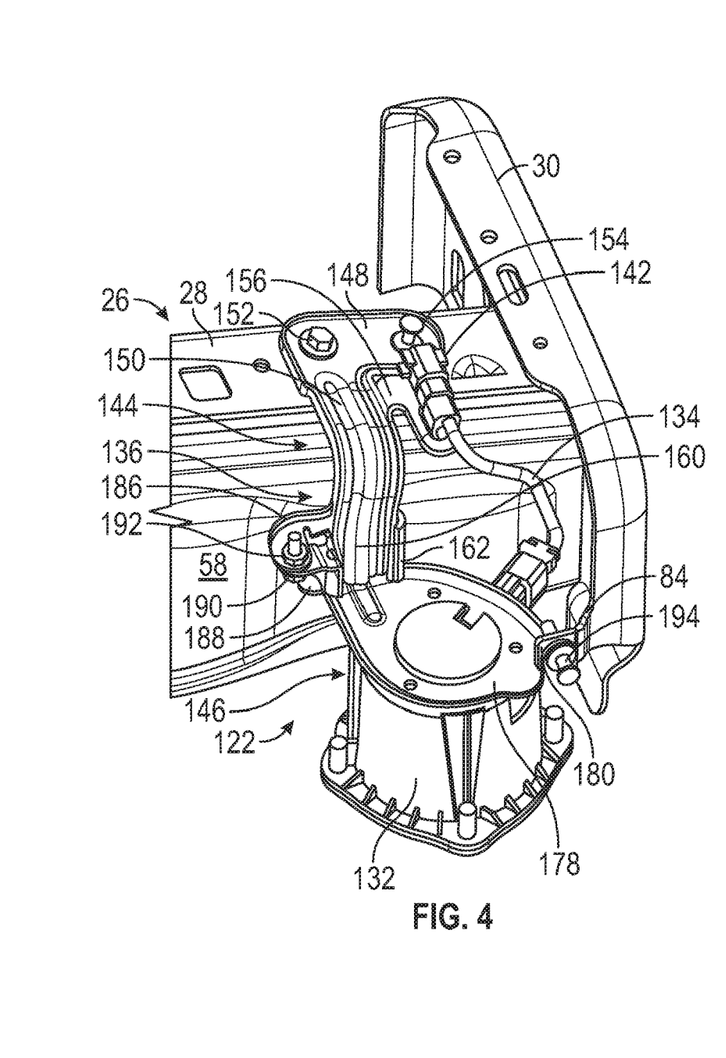
FIG. 4 illustrates an exemplary bracket assembly for mounting an audible vehicle alert system to a vehicle according to a second embodiment of this disclosure.
Figure 5:
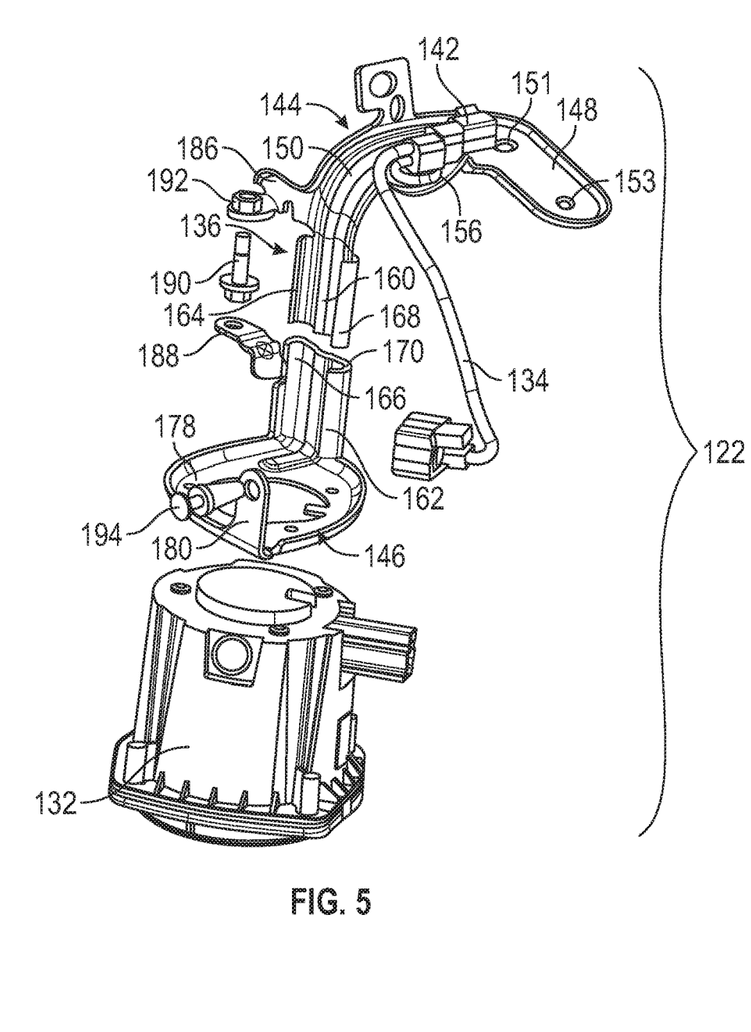
FIG. 5 is an exploded view of the bracket assembly of FIG. 4.

FIGS. 4 and 5 illustrate another exemplary AVAS 122. The AVAS 122 may include a speaker unit 132, a jumper wire 134, and a bracket assembly 136 for securing the speaker unit 132 and the jumper wire 134 relative to the vehicle frame 26. The AVAS 122 may be delivered to the final assembly plant as a complete assembly, thereby simplifying the overall vehicle assembly process.

The bracket assembly 136 of the AVAS 122 may include a first bracket 144 and a second bracket 146 that is detachable from the first bracket 144. The first bracket 144 and the second bracket 146 may be made from dissimilar materials. In an embodiment, the first bracket 144 is a metallic bracket (e.g., steel, etc.) and the second bracket 146 is a plastic bracket (e.g., polypropylene, nylon, etc.). The material make-ups of the first bracket 144 and the second bracket 146 are not intended to limit this disclosure.

The first bracket 144 may include a mounting base 148 and an arm 150 that extends from the mounting base 148. The mounting base 148 may be secured directly to the frame rail 28 of the vehicle frame 26 using a metallic threaded fastener 152 and a plastic push pin 154. The threaded fastener 152 may be received through a first opening 151 of the mounting base 148, and the push pin 154 may be received through a second opening 153 of the mounting base 148. The mounting base 148 may additionally include a platform 156 for receiving and supporting a wiring harness 142 of the jumper wire 134.

The arm 150 may be a curved arm, in an embodiment. In a mounted position of the first bracket 144, the arm 150 extends along an inboard side 58 of the frame rail 28. A distal end portion 160 of the arm 150 may include features for engaging the second bracket 146 of the bracket assembly 136. In an embodiment, the distal end portion 160 of the arm 150 is detachably secured to a track 162 of the second bracket 46. The distal end portion 160 may include a first arm 164 that is slidably received within a first groove 166 of the track 62 and a second arm 168 that is slidably received within a second groove 170 of the track 162. The distal end portion 160 may additionally include a first mounting flange 186 that may be secured to a second mounting flange 188 of the track 162 of the second bracket 146 by a bolt 190 and a nut 192. The track 162 of the second bracket 146 may be slid off of the distal end portion 160 of the arm 150 of the first bracket 144 after removing the nut 192 and the bolt 190 from the first and second mounting flanges 186, 188.

Of course, an opposite configuration is also contemplated in which the track 162 is part of the first bracket 144 and the arms 164, 168 are part of the second bracket 146. This disclosure is therefore not limited to the exact configuration shown in these figures.

The second bracket 146 of the bracket assembly 136 may include a mounting platform 178 for receiving the speaker unit 132. The speaker unit 132 may be mounted to the mounting platform 178 in any known manner. In an embodiment, the mounting platform 178 is generally circular shaped but may include any shape for accommodating the speaker unit 132. The track 162 may extend from the mounting platform 178 at an opposite surface of the mounting platform 178 from that which receives the speaker unit 132.

A mounting tab 180 may additionally extend from the mounting platform 178. The mounting tab 180 may extend in the same direction as the track 162 but is located at a different location of the mounting platform 178 than the track 162. In an embodiment, the mounting tab 180 may be detachably connected to a mounting extension 84 of the mounting bracket 30 via a push pin 194. In this way, the bracket assembly 136 may be removably supported relative to both the frame rail 28 and the mounting bracket 30 when mounted within the electrified vehicle 10.

Like the bracket assembly 36 of FIGS. 2-3, the novel arrangement of the bracket assembly 136 of FIGS. 4-5 allows for a top-down installation of the AVAS 122 while allowing service/repair of the AVAS 122 from below the electrified vehicle 10. Advantageously, no major components of the electrified vehicle 10 (e.g., bumper, cooling module, air dam assembly, headlamp, fender, etc.) need to be removed before detaching the second bracket 146 from the first bracket 144 for servicing the speaker unit 132 or the jumper wire 134 of the AVAS 122.

Figure 6:
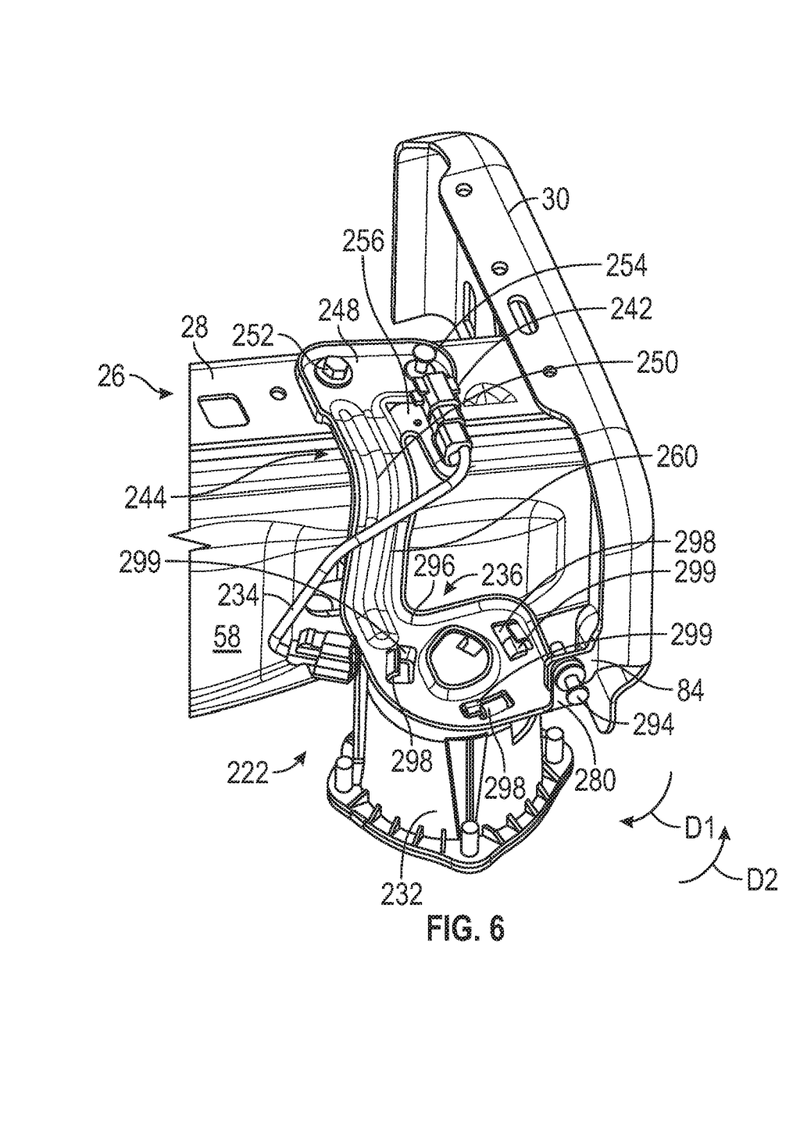
FIG. 6 illustrates an exemplary bracket assembly for mounting an audible vehicle alert system to a vehicle according to a third embodiment of this disclosure.
Figure 7:
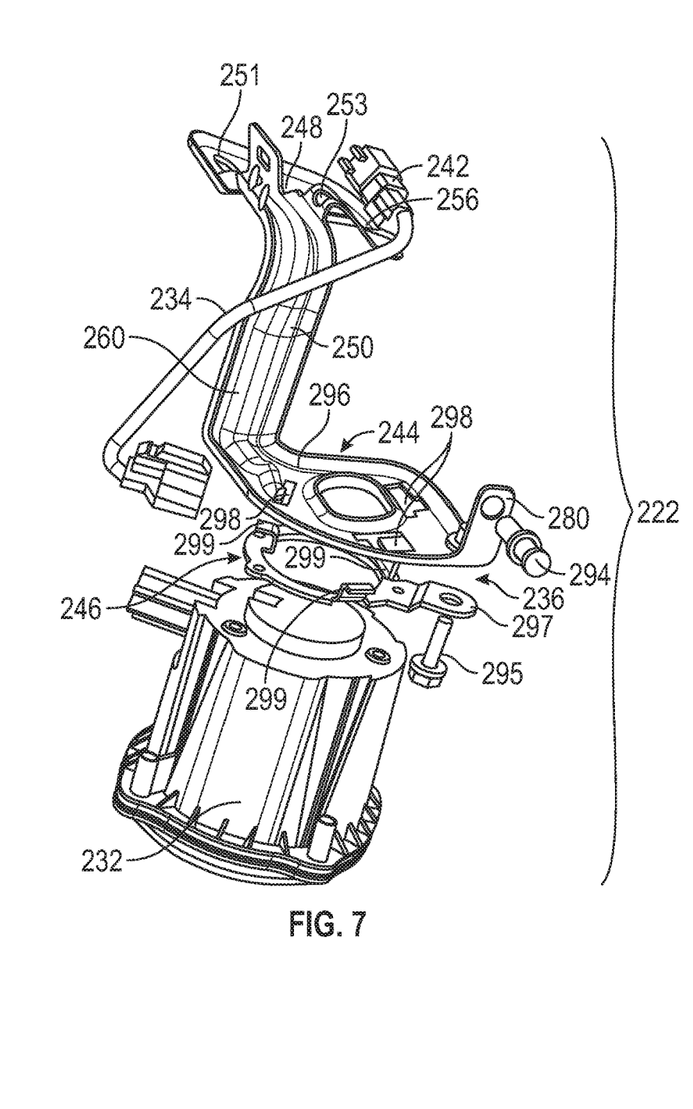
FIG. 7 is an exploded view of the bracket assembly of FIG. 6.

FIGS. 6 and 7 illustrate yet another exemplary AVAS 222. The AVAS 222 may include a speaker unit 232, a jumper wire 234, and a bracket assembly 236 for securing the speaker unit 232 and the jumper wire 234 relative to the vehicle frame 26. The AVAS 222 may be delivered to the final assembly plant as a complete assembly, thereby simplifying the overall vehicle assembly process.

The bracket assembly 236 of the AVAS 222 may include a first bracket 244 and a second bracket 246 that is detachable from the first bracket 244. The first bracket 244 and the second bracket 146 may be made from dissimilar materials. In an embodiment, the first bracket 244 is a metallic bracket (e.g., steel, etc.) and the second bracket 246 is a plastic bracket (e.g., polypropylene, nylon, etc.). The material make-ups of the first bracket 244 and the second bracket 246 are not intended to limit this disclosure.

The first bracket 244 may include a mounting base 248, a mounting platform 296, and an arm 250 that extends between the mounting base 248 and the mounting platform 296. The mounting base 248 may be secured directly to the frame rail 28 of the vehicle frame 26 using a metallic threaded fastener 252 and a plastic push pin 254. The threaded fastener 252 may be received through a first opening 251 of the mounting base 248, and the push pin 254 may be received through a second opening 253 of the mounting base 248. The mounting base 248 may additionally include a platform 256 for receiving and supporting a wiring harness 242 of the jumper wire 234.

The arm 250 may be a curved arm, in an embodiment. In a mounted position of the first bracket 244, the arm 250 extends along an inboard side 58 of the frame rail 28. The mounting platform 296 may extend from a distal end portion 260 of the arm 250. The mounting platform 296 may include a plurality of slotted openings 298 that are each configured to receive finger latch 299 of the second bracket 246. In an embodiment, the finger latches 299 are positioned within the slotted openings 298 and then the second bracket 246 is rotated in a first direction D1 (e.g., in a clockwise direction) to removably secure the second bracket 246 to the first bracket 244.

A mounting tab 280 may additionally extend from the mounting platform 296. In an embodiment, the mounting tab 280 may be detachably connected to a mounting extension 84 of the mounting bracket 30 via a push pin 294. In this way, the bracket assembly 236 may be removably supported relative to both the frame rail 28 and the mounting bracket 30 when mounted within the electrified vehicle 10.

The second bracket 246 may mountingly receive the speaker unit 232. The second bracket 246 may be rotated in a second direction D2 (e.g., a counter clockwise direction) to detach the second bracket 246, and thus the speaker unit 232, from the first bracket 244.

The second bracket 246 may additionally include a mounting tab 297. A fastener 295 may optionally be received through the mounting tab 297 and into the mounting platform 296 to provide back-up fixation of the second bracket 246 relative to the first bracket 244.

Like the bracket assembly 36 of FIGS. 2-3 and the bracket assembly 136 of FIGS. 4-5, the novel arrangement of the bracket assembly 236 of FIGS. 6-7 allows for a top-down installation of the AVAS 222 while allowing service/repair of the AVAS 222 from below the electrified vehicle 10. Advantageously, no major components of the electrified vehicle 10 (e.g., bumper, cooling module, air dam assembly, headlamp, fender, etc.) need to be removed before detaching the second bracket 246 from the first bracket 244 for servicing the speaker unit 232 or the jumper wire 234 of the AVAS 222.

Figure 8:
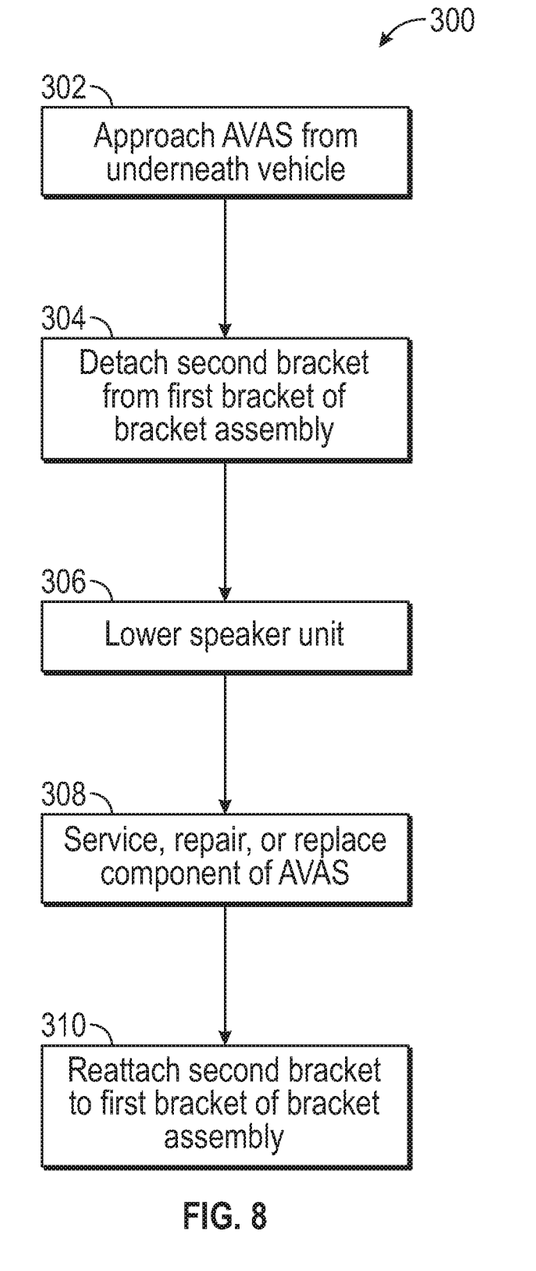
FIG. 8 schematically illustrates a method for servicing a component of an audible vehicle alert system.

FIG. 8, with continued reference to FIGS. 1-7, schematically illustrates a method 300 for servicing a component of the AVAS 22, 122, 222. First, at block 302, a service technician may approach the AVAS 22, 122, 222 from underneath the vehicle (i.e., from the bottom-up). Next, at block 304, the second bracket 46, 146, 146 may be detached from the first bracket 44, 144, 244 of the bracket assembly 36, 136, 236. This step may include manually releasing the finger latch 72 from the window 74 of the track 62 of the bracket assembly 36 of FIGS. 2-3, removing the nut 192 and bolt 190 from the bracket assembly 136 of FIGS. 4-5, or twisting the second bracket 246 off of the first bracket 244 of the bracket assembly 236 of FIGS. 6-7. Step 304 may additionally include removing any push pins used in association with the bracket assembly 36, 136, 236 (e.g., the push pin 194 of the bracket assembly 136 or the push pin 294 of the bracket assembly 236). No special equipment is required to detach the second bracket 46, 146, 246 from the first bracket 44, 144, 244. In addition, no major components of the electrified vehicle 10 (e.g., bumper, cooling module, air dam assembly, headlamp, fender, etc.) need to be removed before detaching the second bracket 46, 146, 246 from the first bracket 44, 144, 244.

Next, at block 306, the service technician may lower the speaker unit 32, 132, 232 downwardly in a direction away from the first bracket 44, 144, 244. The service technician may then service, repair, or replace the speaker unit 32, 132, 232, the jumper wire 34, 134, 234, or any other component of the AVAS 22, 122, 222 at block 308. Finally, at block 310, the second bracket 46, 146, 246 may be reattached to the first bracket 44, 144, 244 to complete the method 300.

The audible vehicle alert systems described herein incorporate detachable bracket assemblies for servicing components of the audible vehicle alert systems. The detachable bracket assemblies may be installed using a top-down approach and may be serviced using a bottom-up approach. No special tools are required for installation or removal of the audible vehicle alert systems. In addition, no major components of the electrified vehicle need to be removed before detaching and servicing components of the audible vehicle alert systems.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An audible vehicle alert system, comprising:
a first bracket;
a second bracket detachably secured to the first bracket;
a speaker unit mounted to the second bracket,
wherein the second bracket includes a mounting tab configured to engage a mounting extension of a mounting bracket; and
a push pin received through the mounting tab and the mounting extension.

2. The audible vehicle alert system as recited in claim 1, wherein the first bracket includes a mounting base and an arm that extends from the mounting base, and further wherein the mounting base is mounted to a frame rail of a vehicle frame and the arm is connected to the second bracket.

3. The audible vehicle alert system as recited in claim 1, wherein one of the first bracket or the second bracket includes a track and the other of the first bracket or the second bracket includes an arm slidably received within a groove of the track.

4. The audible vehicle alert system as recited in claim 1, wherein one of the first bracket or the second bracket includes a track and the other of the first bracket or the second bracket includes a retention finger removably received within a window of the track.

5. The audible vehicle alert system as recited in claim 1, wherein the first bracket includes a first mounting flange that is secured to a second mounting flange of the second bracket by a bolt and a nut.

6. An audible vehicle alert system, comprising:
a first bracket;
a second bracket detachably secured to the first bracket; and
a speaker unit mounted to the second bracket,
wherein a mounting platform of the first bracket includes a plurality of slotted openings that are each configured to receive a finger latch of the second bracket, and further wherein the finger latches are rotatable between a first position and a second position within the plurality of slotted openings to removably secure the second bracket to the first bracket.

7. The audible vehicle alert system as recited in claim 1, comprising a jumper wire that includes a first wiring harness connected to a port of the speaker unit and a second wiring harness supported by a platform of the first bracket.

8. The audible vehicle alert system as recited in claim 1, wherein the second bracket is secured to the first bracket by a fastener.

9. The audible vehicle alert system as recited in claim 1, wherein one of the first bracket or the second bracket is a metallic bracket and the other of the first bracket or the second bracket is a plastic bracket.

10. A vehicle, comprising:
a frame rail;
a mounting bracket secured to the frame rail;
a bumper supported relative to the frame rail by the mounting bracket; and
an audible vehicle alert system mounted to the frame rail,
wherein the audible vehicle alert system comprises:
a first bracket mounted to the frame rail;
a second bracket detachably secured to both the first bracket and the mounting bracket; and
a speaker unit mounted to the second bracket,
wherein one of the first bracket or the second bracket includes a track and the other of the first bracket or the second bracket includes an arm having a distal end portion that includes a first arm slidably received within a first groove of the track and a second arm slidably received within a second groove of the track.

* * * * *